March 11, 1924.
H. OWEN
RIM
Filed Jan. 30, 1920
1,486,795
2 Sheets-Sheet 1
Fig. 1.
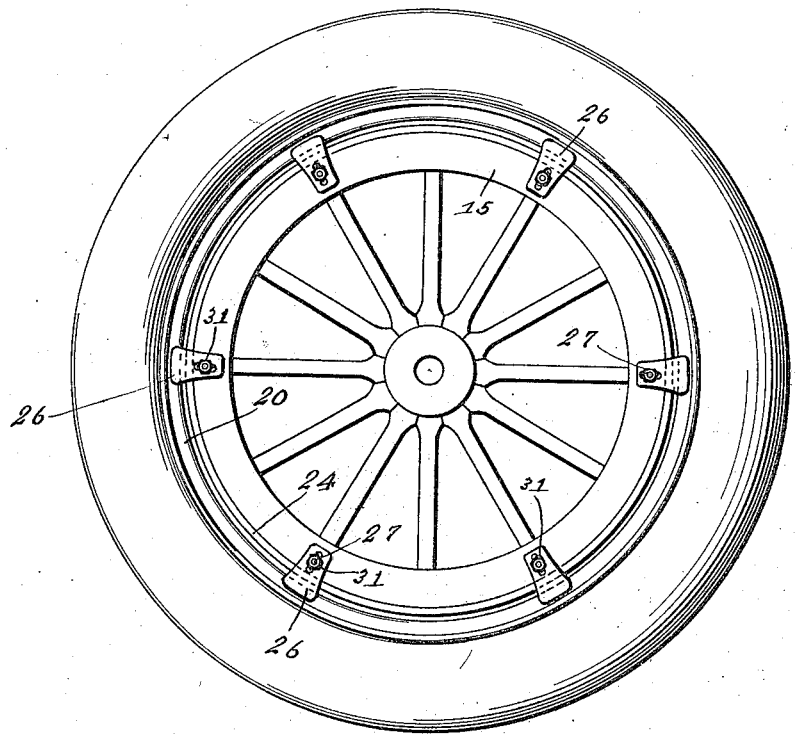
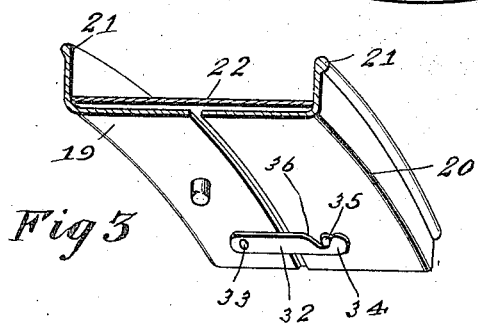
Fig. 3
Fig. 5.
Witnesses
R. A. Thomas
Inventor
Harry Owen
By Victor J. Evans
Attorney March 11, 1924. 1,486,795

H. OWEN

RIM

Filed Jan. 30, 1920 2 Sheets-Sheet 2

Inventor
Harry Owen

Witnesses
R. G. Thomas

By Victor J. Evans
Attorney

Patented Mar. 11, 1924.

1,486,795

UNITED STATES PATENT OFFICE.

HARRY OWEN, OF ROOSEVELT, UTAH.

RIM.

Application filed January 30, 1920. Serial No. 355,272.

*To all whom it may concern:*

Be it known that I, HARRY OWEN, a citizen of the United States, residing at Roosevelt, in the county of Wasatch and State of Utah, have invented new and useful Improvements in Rims, of which the following is a specification.

This invention relates to vehicle rims for pneumatic tires and it is especially designed for use in connection with a tire which comprises the subject matter of an application filed by me March 22, 1919, and bearing the Serial Number 284,257.

An object of the present invention is the provision of a rim which is formed in sections and which is capable of separation to facilitate the application and removal of a tire, novel means being employed for holding the sections assembled and the said means being capable of being automatically released when the rim is in position upon the wheel, thereby permitting of the removal of one of the rim sections if desired.

With the above and other objects in view, the invention includes a rim, which is divided circumferentially to provide separate sections, the line of division being bridged by a ring or annulus so as to form a complete rim, the parts being suitably connected to hold them assembled prior to the application of the rim to the wheel.

The invention further includes the following novel features and details of construction to be hereinafter more fully described and illustrated in the accompanying drawings.

In the drawings:

Figure 1 is a side elevation of a vehicle wheel with the improved rim applied thereto.

Figure 3 is a fragmentary perspective view of a portion of the rim.

Figure 5 is a fragmentary perspective view of a portion of this ring showing the spaced lugs carried thereby.

Figure 4:
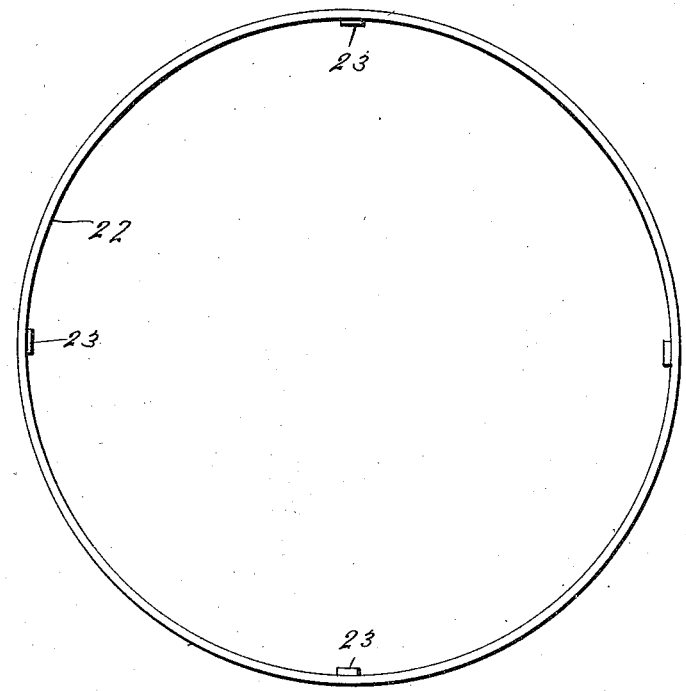
Figure 4 is an edge view of the bridge ring which connects the rim sections.
Figure 6:
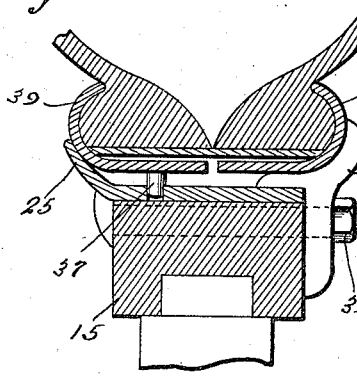
Figure 6 is a view similar to Figure 2 showing the invention adapted for a tire of the "clincher" type.
Figure 2:
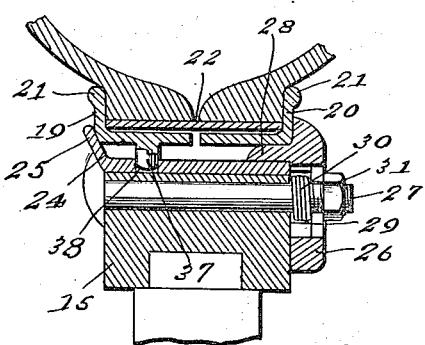
Figure 2 is an enlarged transverse sectional view through the felly of the wheel.

Referring in detail to the drawings, the invention is shown applied to the wheel of a motor vehicle, the felly of the wheel being indicated at 15. The rim is formed by dividing the same centrally and circumferentially to form separate sections 19 and 20, each of which is provided with an annular flange 21. This flange may be formed either as shown in Figures 2 and 3 to accommodate a "straight side" casing, or as shown in Figure 6 for the accommodation of a casing of the "clincher" type. Located within the channel formed by the rim sections, is a ring or annulus 22, the edges of which contact with the inner face of the flange 21 so as to properly space the said flanges for the reception of the tire. Carried by the inner periphery of the ring 22 are spaced lugs 23, which contact with the periphery of the rim sections to space the ring and sections apart.

In positioning the rim upon the wheel the former is placed upon a metal band 24, which surrounds the felly of the wheel which is provided upon one edge with a flange 25 to limit in one direction transverse movement of the rim. Apertured lugs 26 are positioned upon bolts 27, which pass through the felly, the said lugs engaging the opposite flange 21 of the rim so as to hold the said rim against lateral movement. The lugs 26 are formed with a lip 28, which enters the space between the band 24 and the rim, so as to wedge the same apart, as is usual in rims of the demountable type.

The lugs 26 are of novel construction, being provided with a socket 29 in which is positioned a spiral spring 30. This spring bears against the base of the socket and the felly of the wheel, and when the nut 31 of the bolt 27 is loosened, this spring will force the lugs outward to disengage the rim.

To hold the sections 19 and 20 together, before the rim is placed upon the wheel, there is provided a plurality of latches 32, the latter being pivotally mounted as shown at 33 upon the sections 19 and provided with a hooked end 34, for engagement around a stud 35 carried by the section 20. In placing the rim upon the wheel when the nuts 31 are tightened, the sections are forced together and contact with the edges of the ring 22, whereupon the hook 34 which is formed with an inclined portion 36, will ride upon the stud 35 and become disengaged from the said stud permitting the independent removal of the sections 20 if desired. Also carried by the section 19 is a stud 37, which engages a socket or opening 38 provided in the band 24 and prevents creeping of the rim.

The construction shown in Figure 6 in all respects is similar to that shown in Figures 2 and 3, with the exception of the flanges 39 of the rim sections and the curved or hook portions of the lugs 26.

The invention is susceptible of various changes in its form, proportions and minor details of construction and the right is herein reserved to make such changes as properly fall within the scope of the appended claim.

Having described the invention what is claimed is:—

A rim of the character described comprising a pair of detachably secured circumferentially divided sections, means for securing the sections in cooperative association, a ring bridging the secured sections and arranged on the outer side thereof, a plurality of diametrically arranged equi-distantly spaced lugs projecting inwardly from the ring and being adapted to space the ring from the sections and a stud projecting inwardly from one of said sections for the purpose specified.

In testimony whereof I affix my signature.

HARRY OWEN.